United States Patent [19]
Yoshida et al.

[11] Patent Number: 5,883,353
[45] Date of Patent: Mar. 16, 1999

[54] SEAM WELDING MACHINE AND METHOD FOR PROTECTING WELDING ELECTRODES

[75] Inventors: Masaru Yoshida; Akimichi Takeda; Junji Miyata, all of Tokyo, Japan

[73] Assignee: Mitsubishi Denki Kabushiki Kaisha, Tokyo, Japan

[21] Appl. No.: 686,405

[22] Filed: Jul. 25, 1996

[30] Foreign Application Priority Data

Feb. 8, 1996 [JP] Japan .................................. 8-022599

[51] Int. Cl.⁶ .................................................. B23K 11/06
[52] U.S. Cl. ........................................ 219/81; 219/83
[58] Field of Search .......................... 219/61.12, 61.7, 219/67, 78.14, 81, 82, 83, 84, 86.31, 117.1, 120

[56] References Cited

U.S. PATENT DOCUMENTS

| | | | |
|---|---|---|---|
| 2,644,879 | 7/1953 | Schwester | 219/83 X |
| 2,942,094 | 6/1960 | Broad | 219/81 |
| 3,536,883 | 10/1970 | Schmitt | 219/81 |
| 3,832,516 | 8/1974 | Baker | 219/81 |
| 3,909,579 | 9/1975 | Williams et al. | 219/83 |
| 4,536,635 | 8/1985 | Shook | 219/83 |
| 5,125,554 | 6/1992 | Geiermann et al. | 219/82 X |

FOREIGN PATENT DOCUMENTS

| | | | |
|---|---|---|---|
| 54-24239 | 2/1979 | Japan . | |
| 56-53883 | 5/1981 | Japan | 219/81 |
| 58-173087 | 10/1983 | Japan | 219/117.1 |
| 59-222273 | 12/1984 | Japan | 219/81 |
| 3-238179 | 10/1991 | Japan | 219/61.7 |
| 1066625 | 4/1967 | United Kingdom | 219/83 |

Primary Examiner—Gregory L. Mills
Attorney, Agent, or Firm—Burns, Doane, Swecker & Mathis, LLP

[57] ABSTRACT

In a welding electrode protecting machine, welding electrodes are protected against a surface treating agent on strips to be welded by applying a proper amount of electrode protecting agent onto surfaces of welding electrodes prior to or during welding operation. A seam welding machine includes a carriage (6) adapted to move in a direction orthogonal to a direction in which strips (1a, 2a) to be welded are fed, a pair of rotatable disk-like welding electrodes (8a, 8b) disposed on the carriage (6) for welding together the strips (1a, 2a) by pressing the strips (1a, 2a) to each other at surface portions thereof along which the strips are to be welded together as the carriage (6) is moved, electrode protecting agent application roll-like members (21a, 21b) for applying an electrode protecting agent (29) onto rotating surfaces of the welding electrodes (8a, 8b) while being in physical contact with the welding electrodes (8a, 8b) under pressure, the electrode protecting agent (29) which is charged from tanks (30a, 30b) by pumps (31a, 31b), and removing roll-like members (25a, 25b) disposed on the carriage for removing the electrode protecting agent (29) remaining on surface portions along which the strips (1a, 2a) to be welded were welded together at a work side relative to the welding electrodes (8a, 8b).

20 Claims, 7 Drawing Sheets

SEAM WELDING MACHINE AND METHOD FOR PROTECTING WELDING ELECTRODES

BACKGROUND OF THE INVENTION

1. Field of the Invention

The present invention relates generally to a seam welding machine and a method of protecting welding electrodes of the same from degradation. More particularly, the invention is concerned with a seam welding machine of a structure which is capable of protecting peripheral surfaces of welding electrodes or surfaces of welded product against deposition of an agent used for surface treatment of sheet-like materials to be welded together, by applying an electrode protecting agent onto peripheral surfaces of the welding electrodes. The invention is also directed to a method of protecting the welding electrodes of such a seam welding machine.

2. Description of Related Art

Figure 7A:
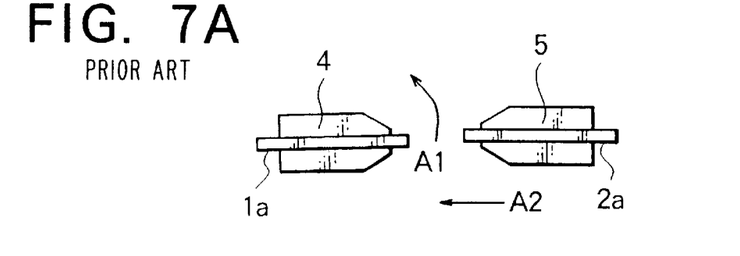
FIG. 7A is a schematic view for illustrating a conventional seam welding method carried out by using a seam welding machine known heretofore.
Figure 7B:
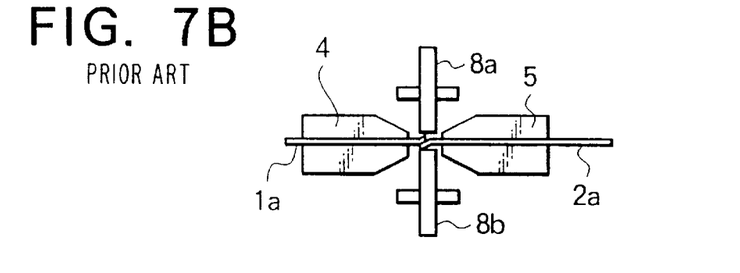
FIG. 7B is a vertical sectional view for illustrating cut end portions of strips to be welded which are superposed onto each other over a width for welding.
Figure 7C:
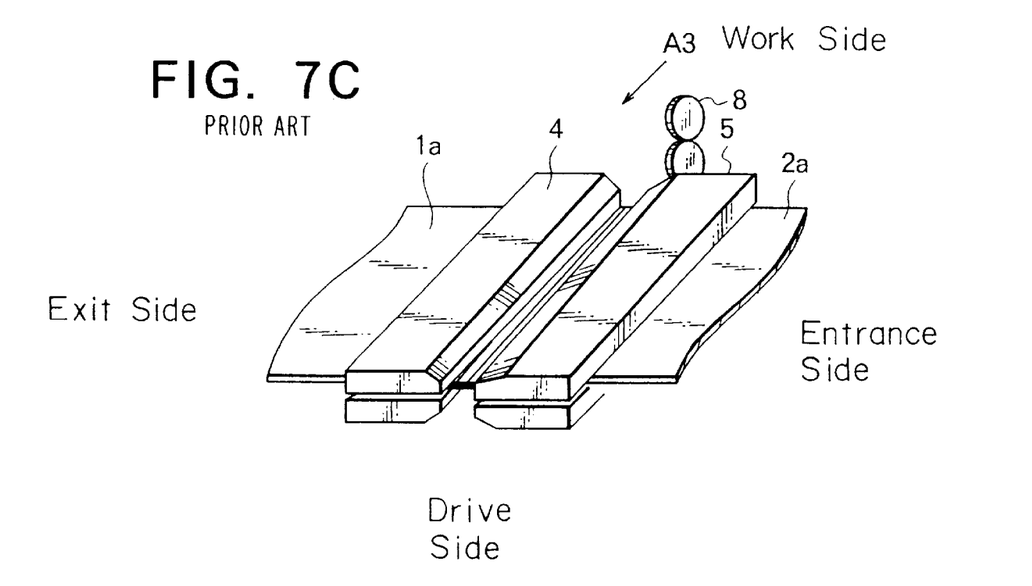
FIG. 7C is a view for illustrating an welding operation of the conventional welding machine.

For having a better understanding of the present invention, description will first be directed to the background techniques thereof. FIGS. 7A to 7C are schematic views for illustrating a conventional welding method carried out by a seam welding machine known heretofore, which is disclosed, for example, in Japanese Unexamined Patent Application Publication No. 258382/1992 (JP-A-4-258382). Referring to the figures, there are mounted on a common base (not shown) of the welding machine a clamping device 4 positioned at an exit side and a clamping device 5 positioned at an entrance side in such disposition that respective tip ends of both the clamping devices 4 and 5 face in opposition to each other. Strips 1a and 2a having respective cut end portions along which the strips 1a and 2a (i.e., materials to be welded) are to be welded together are fixedly held by the clamping devices 4 and 5, respectively, in a sandwiched manner. Upon welding, the clamping device 4 located at the exit side is slightly swung upwardly, while the clamping device 5 of the entrance side is caused to move forwardly in the feeding direction of the strip 2a as indicated by arrows A1 and A2, respectively, in FIG. 7A.

Subsequently, the cut end portions of the strips 1a and 2a are superposed onto each other over a width sufficient for welding, as can be seen from FIG. 7B. The superposed end portions of the strips 1a and 2a are pressed against each other in a vertical direction by means of a pair of upper and lower welding electrodes 8a and 8b each of a rotatable disk type fixedly mounted on a movable carriage (not shown), which is moved in a direction orthogonal to the direction in which the strips 1a and 2a during the welding operation are fed, as indicated by an arrow A3 in FIG. 7C. In this state, a welding current is applied across the upper and lower welding electrodes 8a and 8b from a DC power supply apparatus (not shown), as a result of which a welding current flows through the superposed end portions of the strips 1a and 2a. In this manner, the seam welding is carried out.

The conventional seam welding machine briefly described above suffers a problem that when strips such as steel sheets which have previously undergone a surface treatment, such as plating are to be welded together, the plated material tends to be deposited on the electrode surfaces and/or the welded product. Additionally, the materials forming surface portions of the welding electrodes are likely to alloy with the plated material, involving degradation as well as nonuniformity in the quality of welding.

More specifically, because a melting point of a plated material is normally lower than that of the steel sheet, i.e., the material which will undergo the welding, the plated material can easily be melted by the heat of the welding to be alloyed with the surface material of the welding electrodes or deposited as oxides on the electrode surfaces. As a consequence, electrical conductivity as well as thermal conductivity of the surface portions of the welding electrodes is impaired, incurring such unwanted situation that the heat input balance which is one of the most important factors for resistance welding is lost (i.e., the heat input to a combination of the welding electrodes and the materials to be welded increases when compared with the heat input to the materials to be welded), which eventually involves deterioration in the quality of welding.

For coping with the problems mentioned above, there has already been proposed a method of protecting the welding electrodes from the unwanted phenomenon, as is described, for example, in Japanese Unexamined Patent Application Publication No. 24239/1979 (JP-A-54-24239), according to which an electrode protecting agent is sprayed onto tip or peripheral end portions of the welding electrodes by using nozzles to thereby protect the surface of the welding electrodes from contamination with the plated material. However, in the welding electrode protecting methods known heretofore, no consideration is paid to the post-treatment of the electrode protecting agent as applied to the welding electrodes. Additionally, it is noted that no measures are proposed for controlling appropriately or properly the amount of the electrode protecting agent as applied by the spraying.

Such being the circumstances, when no post-treatment is performed after spraying the electrode protecting agent or when an unnecessarily large amount of the electrode protecting agent is deposited on the electrode surface, the electrode protecting agent is prone to drop onto a surface of strips as welded. In this conjunction, it should be mentioned that when the state in which an oily electrode protecting agent is deposited on the surface of the strip materials as welded is left as it is, finishing treatments such as color coating of the welded strip is likely to suffer a difficulty such as a fault in the coating or the like, causing the outer appearance of the finished surface of a steel sheet manufactured as a final product to be inattractive. For this reason, it is extremely important to prevent the electrode protecting agent from being deposited in an unnecessarily large amount. Of course, situations in which the electrode protecting agent remains as deposited on the surface of the strip or sheet which has undergone welding has to be avoided without fail.

SUMMARY OF THE INVENTION

In light of the state of the art described above, it is a primary object of the present invention to provide a welding electrode protecting method which is capable of not only applying a correct or appropriate amount of an electrode protecting agent to surfaces of welding electrodes in precedence to or in the course of a welding process but also removing the electrode protecting agent deposited on a material after welding.

Another important object of the present invention is to provide a seam welding machine for realizing the welding electrode protecting method mentioned above.

In view of the above and other objects which will become apparent as the description proceeds, there is provided according to aspect of the present invention a seam welding machine which includes a movable supporting member which is adapted to move in a direction orthogonal to a direction in which materials to be welded are fed, a pair of rotatable disk-like welding electrodes disposed on the movable supporting member for welding together the materials by pressing them to each other at surface portions thereof along which the materials are to be welded together as the movable supporting member is moved, and an electrode protecting agent applying means for applying an electrode protecting agent onto rotating surfaces of the welding electrodes while being in physical contact with the welding electrodes under a pressure, the electrode protecting agent being charged from an electrode protecting agent feeding means.

According to another aspect of the present invention, there is provided a seam welding machine which includes a movable supporting member which is adapted to move in a direction orthogonal to a direction in which materials to be welded are fed, a pair of rotatable disk-like welding electrodes disposed on the movable supporting member for welding together the materials by pressing the materials to each other at surface portions thereof along which the materials are to be welded together as the movable supporting member is moved, and an electrode protecting agent applying means for applying an electrode protecting agent onto surface portions of the materials along which the materials are to be welded together at an entrance side relative to the welding electrodes while being placed in contact with the surface portions of the materials to be welded under a pressure, the electrode protecting agent being charged from an electrode protecting agent feeding means.

In a preferred mode for carrying out the invention, the seam welding machine may further include a removal means which is adapted to be brought into contact with a rotating surface of each of the welding electrodes to thereby remove the electrode protecting agent applied in excess from the rotating surface of each of the welding electrodes.

In another preferred mode for carrying out the invention, the seam welding machine may further include a removal means which is disposed on the movable supporting member for removing the electrode protecting agent remaining on surface-portions along which the materials to be welded were welded together at an exit side relative to the welding electrodes.

The removal means may preferably be formed of a roll-like member of a soft material capable of wiping off the electrode protecting agent.

Further, the electrode protecting agent applying means may preferably be formed of a roll-like member of a soft material which allows the electrode protecting agent as supplied or charged to soak out.

In another preferred mode for carrying out the invention, the electrode protecting agent applying means may be so arranged as to be driven reciprocatively relative to the materials to be welded together.

In yet another preferred mode for carrying out the invention, the electrode protecting agent removing means may be so arranged as to be driven reciprocatively relative to the materials to be welded together.

In carrying out the invention, the roll-like electrode protecting agent removing means may preferably be equipped with a roll-like surface portion which is rotationally driven, similarly the roll-like electrode protecting agent applying means may preferably have a roll-like surface portion which is also rotationally driven.

According to a further aspect of the present invention, there is provided a method of protecting welding electrodes of a seam welding method, which comprises the steps of charging or impregnating an electrode protecting agent applying means with an electrode protecting agent by an electrode protecting agent feeding means, applying the electrode protecting agent as charged onto peripheral surfaces of a pair of rotatable disk type welding electrodes while rotating the same at least at a time point before a seam welding is started or in the course of the seam welding, and removing by a removal means the electrode protecting agent remaining on a material which has undergone the seam welding by the pair of welding electrodes applied with the electrode protecting agent and fed out therefrom.

Parenthetically, in the electrode protecting agent applying step mentioned above, the electrode protecting agent should be applied onto the welding electrodes continuously during the welding operation.

Furthermore, in the electrode protecting agent applying step mentioned above, the electrode protecting agent may preferably be applied onto surface portions of materials which are to be welded to each other on the way to being fed to the welding electrodes, to thereby apply the electrode protecting agent onto peripheral surfaces of the welding electrodes.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Now, the present invention will be described in detail in conjunction with what is presently considered as preferred or typical embodiments thereof by reference to the drawings. In the following description, like reference characters designate like or corresponding parts throughout the several views. Also in the following description, it is to be understood that such terms as "left", "right", "upper", "lower", "upwards", "downwards", "vertical", "horizontal" and the like are words of convenience and are not to be construed as limiting terms.

Embodiment 1

A seam welding machine according to a first embodiment of the present invention will be described by reference to FIG. 1, which shows schematically a structure of a seam welding machine according to the first embodiment of the invention. Referring to the figure, a carriage 6 substantially of an inverted C-like cross section and constituting a movable supporting means is adapted to move in a direction orthogonal to the direction in which strips 1a and 2a which are to undergo the seam welding (i.e., the materials to be welded) are fed by means of a carriage driving unit (not shown) under the guidance of a guide mechanism disposed on a common base (not shown either).

The carriage 6 is equipped with a shearing machine (not shown) for cutting the strips 1a and 2a for forming a rear end portion thereof as well as a front or leading end portion of the strip 2a, a cylinder actuator apparatus for selectively moving upwardly or downwardly the shearing machine, and an upper welding electrode 8a and a lower welding electrode 8b, each of a rotatable disk type. These welding electrodes 8a and 8b are mounted in such disposition that peripheral surfaces thereof face in opposition to each other. At this juncture, it should be noted that the height at which the lower welding electrode 8b is installed is so selected as to conform with a level at which the strips 1a and 2a are fed.

More specifically, the upper welding electrode 8a is pivotally coupled to a tip end portion of the rod La of the cylinder constituting a driving unit 8c installed at a top of the carriage 6 and adapted to be moved upwardly or downwardly (i.e., substantially in the vertical direction) by means of the driving unit 8c.

Additionally, rods L1 and L2 of cylinders constituting driving units 22a and 24a, respectively, and extending downwardly are mounted on the rod La above the upper welding electrode 8a symmetrically relative thereto at work and drive sides, respectively, of the upper welding electrode 8a. An upper application roll-like member 21a for applying an electrode protecting agent on a circumferential surface (electrode surface) of the upper welding electrode 8a is rotatably mounted on the rod L1 at a bottom or tip end thereof, while a first upper removing roll-like member 23a for removing the electrode protecting agent deposited on the surface of the upper welding electrode 8a is rotatably mounted on the bottom end of the rod L2.

Further, rods L3 and L4 of cylinders constituting driving units 22b and 24b, respectively, and extending upwardly are mounted below the lower welding electrode 8b symmetrically at entrance and exit sides, respectively, of the electrode 8b. A lower application roll-like member 21b for applying an electrode protecting agent on an electrode surface of the lower welding electrode 8b is rotatably mounted on the rod L3 at a top end thereof, while a first lower removing roll-like member 23b for removing an electrode protecting agent deposited on the surface of the lower welding electrode 8b is rotatably mounted on the top end of the rod L2.

At the exit side of the welded strip 1a; 2a undergoing the welding operation between the upper and lower welding electrodes 8a and 8b, a cylinder constituting a part of a driving unit 26a and having a rod L5 extending downwards through the carriage 6 is installed at the top surface of the carriage 6, while a cylinder constituting a part of a driving unit 26b and having a rod L6 extending upwardly is mounted on an inner bottom surface of the carriage 6. Further, a second upper removing roll-like member 25a is rotatably mounted on the rod L5 at a bottom end thereof for the purpose of removing surplus or excessive electrode protecting agent remaining as deposited on the upper surface of the welded strip 1a; 2a.

Furthermore, with a view to remove the excessive electrode protecting agent deposited on the lower surface of the strip 1a; 2a, a second lower removing roll-like member 25b is rotatably mounted on the rod L6 at the upper end portion thereof. Parenthetically, other rods La, L1 to L4 are actuated reciprocatively substantially in the vertical direction by associated cylinders which constitute driving units 8c, 22a, 22b, 24a and 24b, respectively.

For applying the electrode protecting agent to the upper and lower welding electrodes 8a and 8b, there are provided an upper application roll-like member 21a and a lower application roll-like member 21b which cooperate to constitute an application means and which are supplied with a predetermined amount of the electrode protecting agent 29 from tanks 30a and 30b, respectively, which store the electrode protecting agent, through pumps 31a and 31b, respectively. The tank 30a and the pump 31a are provided in association with the upper application roll-like member 21a while the tank 30b and the pump 31b are provided in association with the lower application roll-like member 21b. Now, description will be directed to an exemplary structure of the lower application roll-like member 21b by reference to FIGS. 5 and 6, being understood that the upper application roll-like member 21a is implemented by a similar structure. Referring to the figures, the lower application roll-like member 21b is comprised of a roll 34b having a disk like configuration and sponge layer 35b which covers the outer peripheral surface of the roll 34b with a uniform thickness and which has an outer surface adapted to bear against the outer peripheral surface of the lower welding electrode 8b under a pressure. Defined by an inner peripheral surface of the roll 34b is a cylindrical hollow chamber 36b which is formed around a bearing L31 of the roll 34b and from which a plurality of radial passages (e.g. four passages) 361b extend to the sponge layer 35b.

Figure 5:
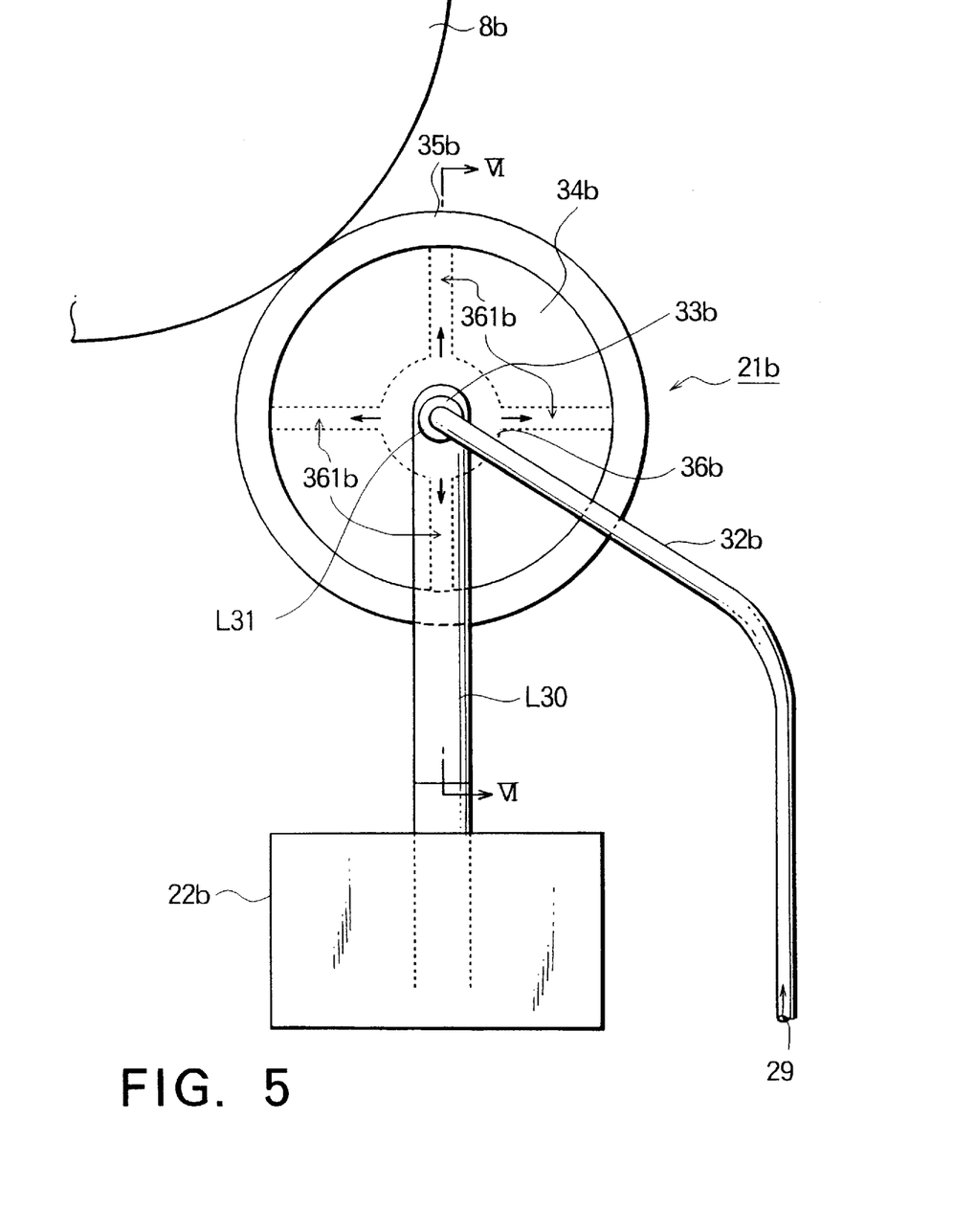
FIG. 5 is a plan view showing a structure of protecting agent application roll-like members which can be employed in the seam welding machines according to the first to third embodiments of the invention.
Figure 6:
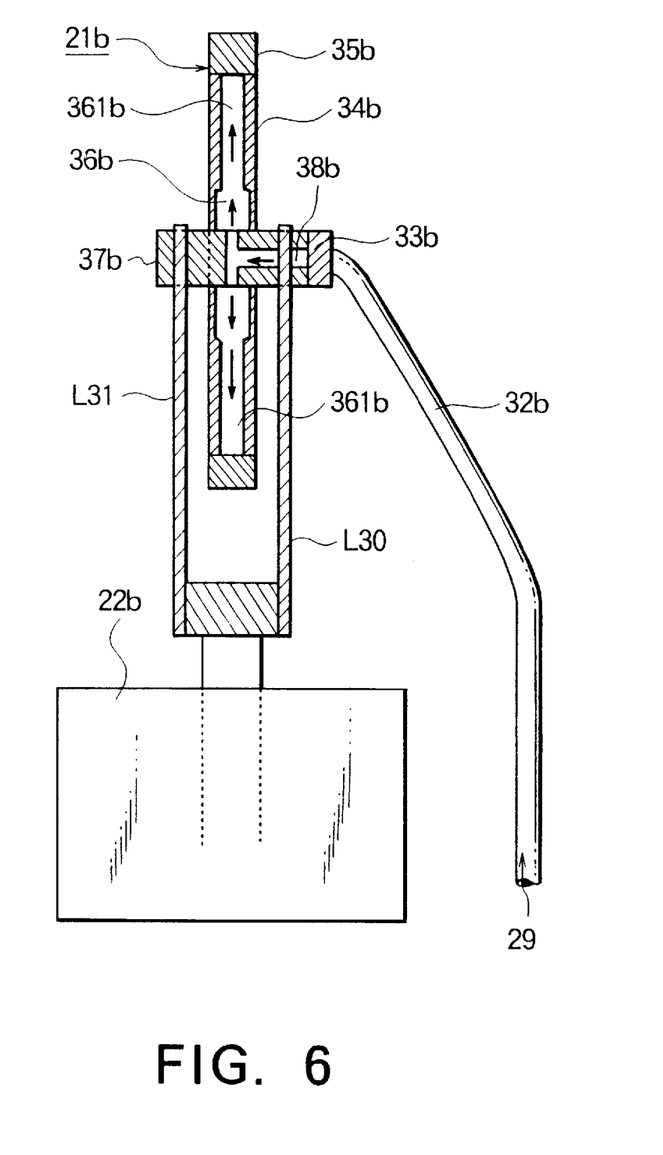
FIG. 6 is a side view showing a structure of the protecting agent application roll-like members for the seam welding machines according to the first to third embodiments of the invention.

Further formed in a roll shaft 37b extending through the bearing L31 and rotatably supported by the bearing L31 fixed at a predetermined position is a center passage 38b which extends to the cylindrical hollow chamber 36b to be hydraulically communicated thereto for feeding the electrode protecting agent to the cylindrical hollow chamber 36b and hence to the sponge layer 35b by way of the radial passages 361b. To this end, the center passage 38b is connected to a tube 32b led out from the pump 31b by means of a coupling 33b. In this conjunction, it should be mentioned that the coupling 33b has an inner peripheral surface which is adapted-to rotate slidingly in contact with the outer peripheral surface of the tube 32b. On the other hand, the roll shaft 37b is rotatably supported by means of a bearing L31 of the roll supporting member L30.

At this juncture, it should be mentioned that in the case of the seam welding machine according to the instant embodiment of the invention, the upper welding electrode 8a as well as the lower welding electrode 8b is so formed as to have a diameter or a circumferential length which allows a single pass of welding to be effected at least within one complete rotation of the electrodes. The contact pressure applied to the outer peripheral surface of the upper welding electrode 8a by the sponge layer 35a of the roll 34a constituting the upper application roll-like member 21a is determined by a length of the stroke of the rod L1 over which the rod L1 is moved downwardly. As a consequence, the thickness of a film of the electrode protecting agent 29 applied over the outer peripheral surface of the upper welding electrode 8a is determined by the stroke length mentioned above. Thus, it is possible to apply onto the outer peripheral surface of the upper welding electrode 8a a proper or appropriate amount of the electrode protecting agent 29.

Similarly, the downward stroke length of the rod L2 is so selected that the sponge-layer portion of the first upper removing roll-like member 23a is pressed onto the outer peripheral surface of the upper welding electrode 8a under a predetermined constant contact pressure. Accordingly, the electrode protecting agent 29 applied over the outer peripheral surface of the upper welding electrode 8a in excess can be removed by the first upper removing roll-like member 23a. The adjustment or selective determination of the stroke length described above holds valid for the lower application roll-like member 21b and the first lower removing roll-like member 23b as well.

Figure 1:
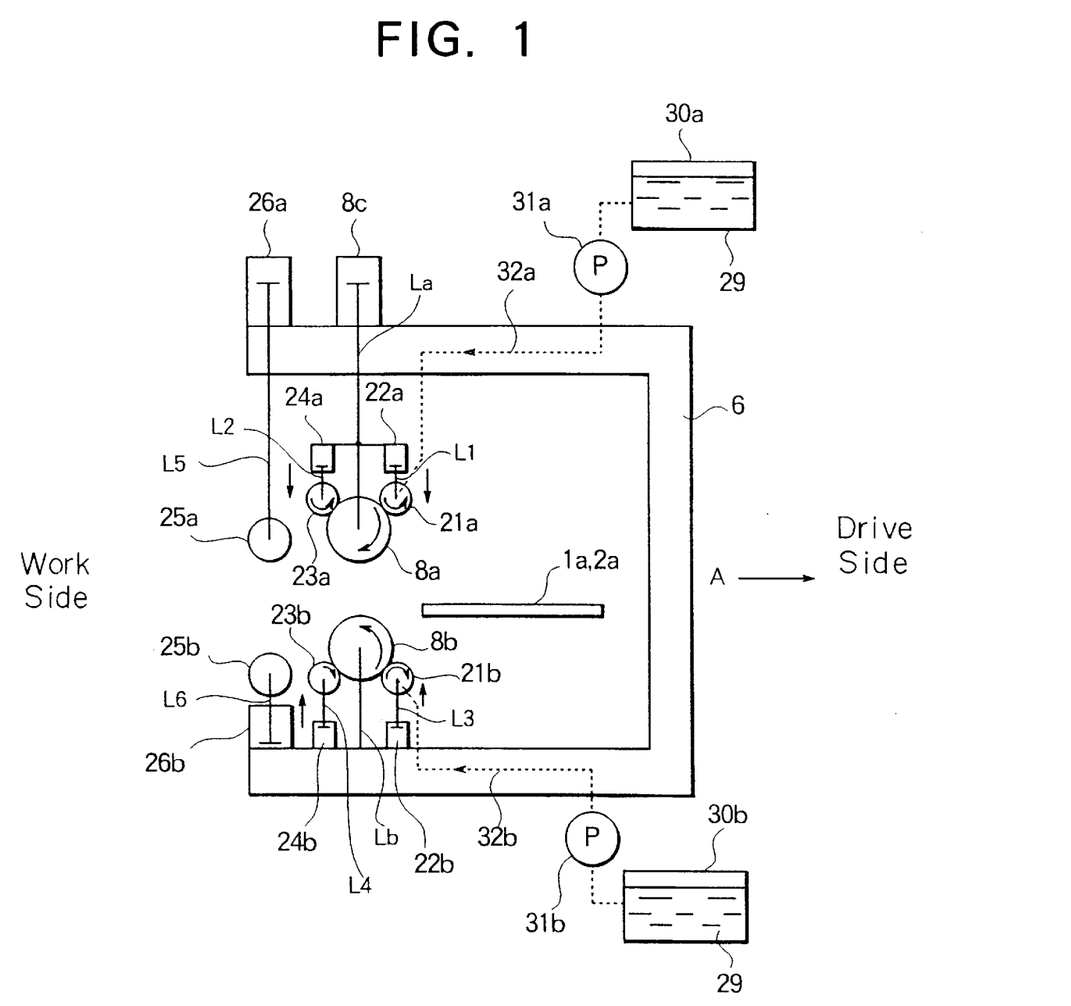
FIG. 1 is a diagram showing schematically a structure of a seam welding machine according to a first embodiment of the present invention.
Figure 3:
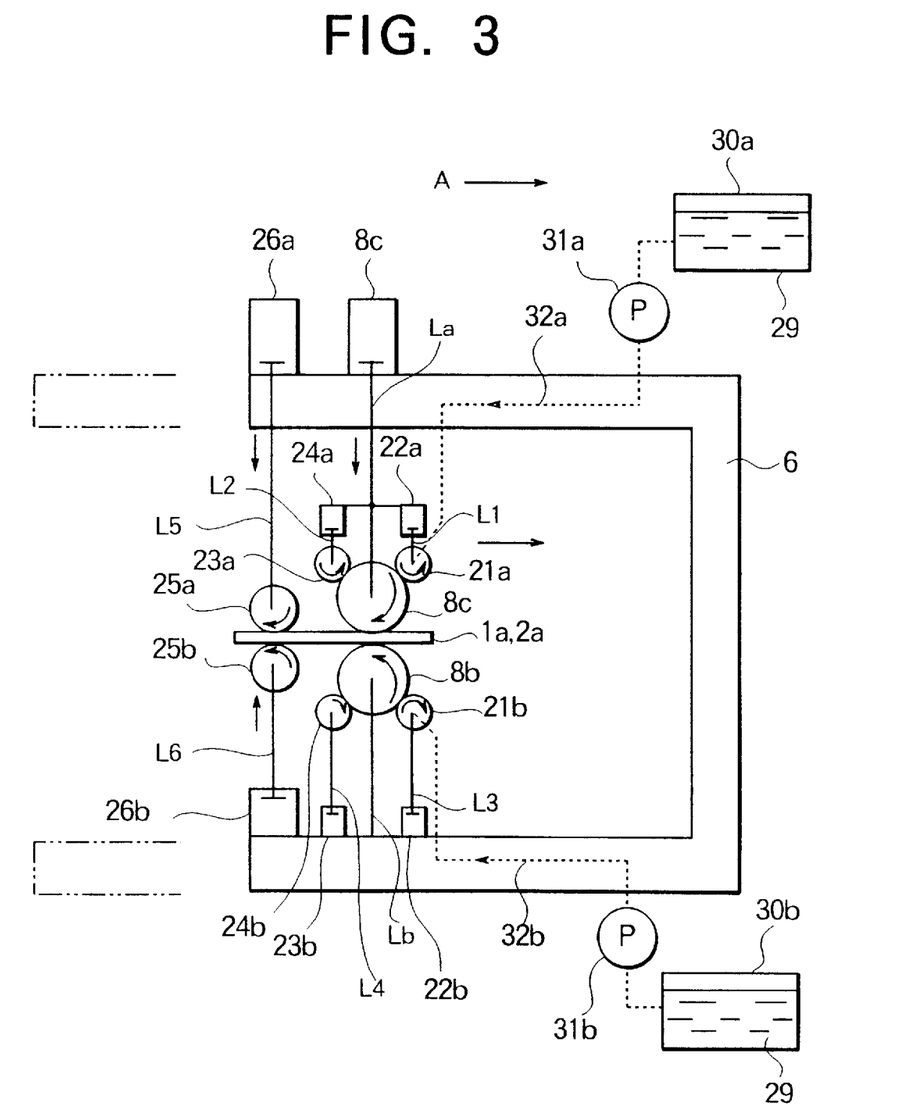
FIG. 3 is a schematic view of a seam welding machine for illustrating an welding electrode protecting method and arrangement according to a second embodiment of the present invention.

Next, description will turn to operation of the seam welding machine according to the instant embodiment of the invention by reference to FIGS. 1 and 3. At first, in precedence to starting the seam welding, the electrode protecting agent 29 is fed out from the tanks 30a and 30b by way of the associated pumps 31a and 31b to the tubes 32a and 32b, respectively, whereby the cylindrical hollow chambers 36a and 36b of the upper and lower application roll-like members 21a and 21b are charged with the electrode protecting agent 29 which then soaks into the sponge layers 35a and 35b, respectively.

Subsequently, the upper welding electrode 8a and the second upper removing roll-like member 25a are moved downwardly by actuating correspondingly the driving unit 8c and the driving unit 26a, respectively. On the other hand, the second lower removing roll-like member 25b is moved upwardly by the driving unit 26b. Thus, the peripheral surfaces of the upper and lower application roll-like members 21a and 21b are brought into contact with the peripheral surfaces of the upper and lower welding electrodes 8a and 8b under pressure by means of the driving units 22a and 22b, respectively.

In this state, the upper and lower welding electrodes 8a and 8b are rotated. Then, the electrode protecting agent 29 soaked out through the sponge layers 35a and 35b under the effect of capillary action is applied over the whole peripheral surfaces of the upper and lower welding electrodes 8a and 8b, respectively. After application of the electrode protecting agent 29, measures are taken to make appropriate the application amount of the electrode protecting agent 29 by removing the excessive protecting agent. To this end, the first upper and lower removing roll-like members 23a and 23b are driven by the driving units 24a and 24b, respectively, to thereby cause the peripheral surfaces of the first upper and lower removing roll-like members 23a and 23b to press against the peripheral surfaces of the welding electrodes, respectively, whereby the excess electrode protecting agent 29 is soaked up to be removed from the welding electrodes. In this manner, application of the electrode protecting agent 29 in an appropriate amount over the whole peripheral surfaces of the welding electrodes can be ensured.

Upon starting of the seam welding, the upper and lower application roll-like members 21a and 21b are moved away from the upper and lower welding electrodes 8a and 8b by operating correspondingly the driving units 22a and 22b, respectively, with the first upper and lower removing roll-like members 23a and 23b being similarly detached from the welding electrodes by means of the driving units 24a and 24b, respectively. On the other hand, the upper welding electrode 8a is moved downwardly toward the lower welding electrode 8b by the driving unit 8c while the second upper removing roll-like member 25a is moved downwardly toward the lower welding electrode 8c by means of the driving unit 8c with the second upper removing roll-like member 25a being moved downwardly by the driving unit 26a, while the second lower removing roll-like member 25b is moved upwardly.

When the carriage 6 is moved in the direction indicated by an arrow A, the strips 1a and 2a held as sandwiched between the clamps (not shown) installed at the entrance and exit sides, respectively, are pushed into and between the peripheral surfaces of the upper and lower welding electrodes 8a and 8b, whereby superposed portions of the strips 1a and 2a are pressed to each other by means of the upper and lower welding electrodes 8a and 8b. As the upper and lower welding electrodes 8a and 8b are displaced in the direction opposite to that indicated by the arrow A with the carriage 6 moving in the direction A, the strips 1a and 2a are progressively welded together.

The strip 1a; 2a undergoing the seam welding is fed out from the upper and lower welding electrodes 8a and 8b into between the second upper and lower removing roll-like members 25a and 25b disposed at the work side of the seam welding machine. The excess electrode protecting agent 29 remaining on the surface of the strip 1a; 2a is removed by the second upper and lower removing roll-like members 25a and 25b to a possible minimum. Thus, adverse influence of the residual electrode protecting agent 29 which will otherwise affect a succeeding surface treatment of the strip 1a; 2a can positively be suppressed.

At this juncture, it should also be mentioned that because the electrode protecting agent 29 is applied over the peripheral surfaces of the upper and lower welding electrodes 8a and 8b by the upper and lower application roll-like members 21a and 21b in a rubbing manner, so to say, the electrode protecting agent 29 can positively be prevented from dripping onto the strip 1a; 2a in the course of the seam welding, which can not be expected when the electrode protecting agent 29 is applied by spraying.

Embodiment 2

In the case of the seam welding machine according to the first embodiment of the invention, the electrode protecting agent 29 is applied to the peripheral surfaces of the upper and lower welding electrodes 8a and 8b before starting the welding operation, whereon the excess electrode protecting agent 29 is removed by means of the first upper and lower removing roll-like members 23a and 23b. However, application of the electrode protecting agent 29 to the peripheral surfaces of the welding electrodes may be applied continuously onto the peripheral surfaces of the welding electrodes during the seam welding operation while removing the excess electrode protecting agent 29.

Figure 2:
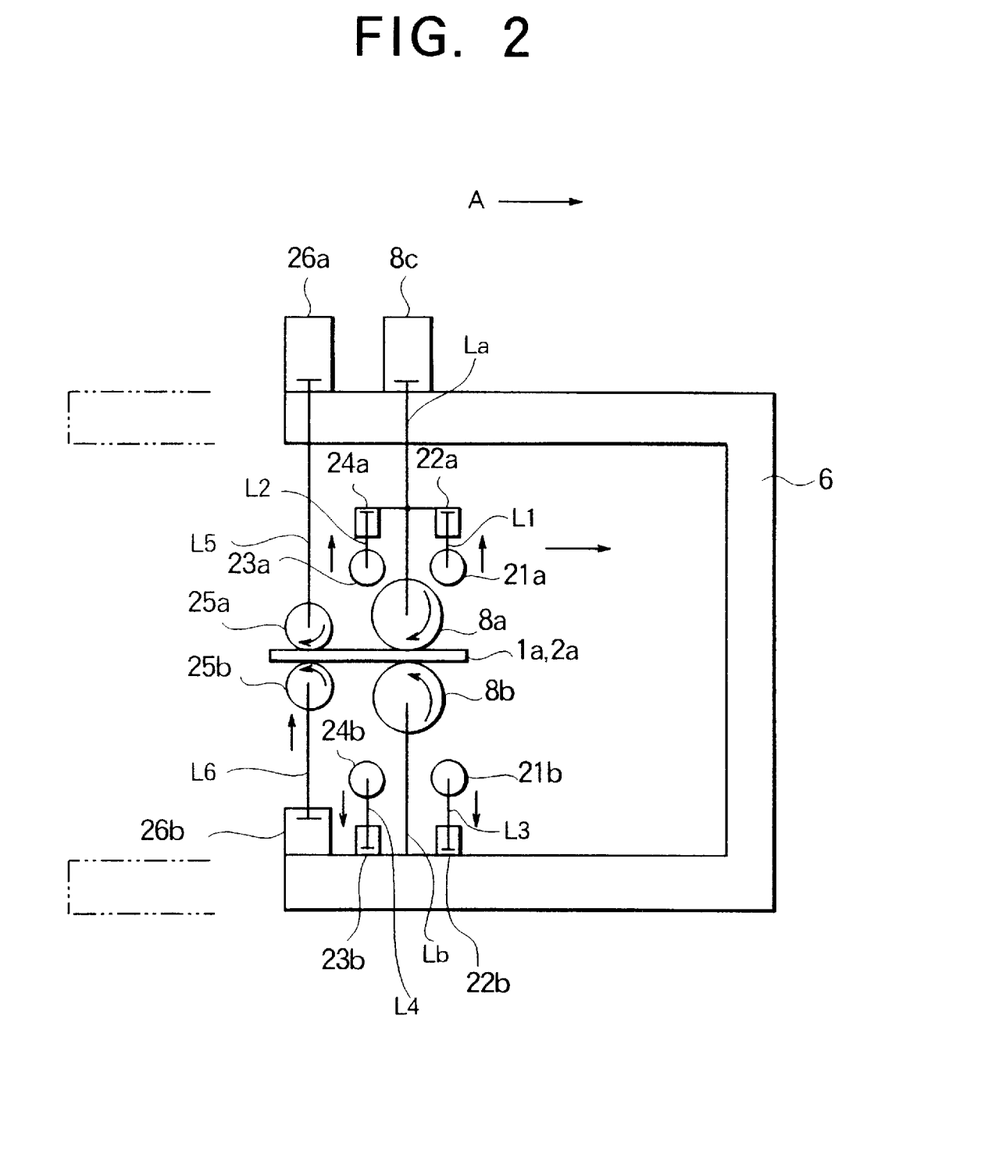
FIG. 2 is a diagram for illustrating operations of the seam welding machine according to the first embodiment of the invention.

FIG. 3 is a view of a seam welding machine for illustrating the welding electrode protecting scheme or method according to a second embodiment of the present invention. In FIG. 2, parts same as or equivalent to those shown in FIGS. 1 and 2 are denoted by like reference characters. The seam welding machine according to the instant embodiment of the invention differs from the machine described previously by reference to FIG. 1 in that the roll surfaces of the upper and lower application roll-like members 21a and 21b are pressed onto the peripheral surfaces of the upper and lower welding electrodes 8a and 8b by means of the driving units 22a and 22b in the course of seam welding of the strips 1a and 2a by the upper and lower welding electrodes 8a and 8b rotating in the directions opposite to each other.

The electrode protecting agent 29 soaking out through the sponge layers 35a and 35b is applied to the whole peripheral surfaces of the welding electrodes, respectively. On the other hand, the first upper and lower removing roll-like members 23a and 23b are brought into contact with the peripheral surfaces of the welding electrodes by means of the driving units 24a and 24b, for removing the excess part of the electrode protecting agent 29 as applied, to thereby ensure a proper amount of application of the electrode protecting agent 29 for the welding electrodes.

The strip 1a; 2a undergoing to the seam welding is fed out from the upper and lower welding electrodes 8a and 8b to be transported into between the second upper and lower removing roll-like members 25a and 25b which are located at the work side of the seam welding machine. The excess electrode protecting agent 29 remaining on the welded surfaces is thus removed.

With the structure or arrangement of the seam welding machine described above, there arises no necessity for moving away the upper welding electrode 8a from the surface of the strip 1a; 2a in order to apply the electrode protecting agent 29 during the welding operation even in the case where the seam welding is not completed upon or after a single full rotation of the upper and lower welding electrodes 8a and 8b because the welding length of the strips 1a and 2a for one pass is longer than the circumferential lengths of the upper and lower welding electrodes 8a and 8b. Thus, a correct amount of the electrode protecting agent 29 can be applied continuously even in the course of the welding. Besides, due to the fact that welding electrodes having a circumferential length which is shorter than the one-pass welding length can be employed, the seam welding machine can be implemented expensively in a miniaturized structure, presenting an additional advantage.

Embodiment 3

In the case of the seam welding machine according to the second embodiment of the invention, such arrangement is adopted that an appropriate amount of the electrode protecting agent 29 can continuously be applied to the peripheral surfaces of the welding electrodes until one pass of welding has been completed even when the circumferential length of the welding electrode is shorter than the welding length as required. This can be realized by applying the electrode protecting agent 29 onto the upper and lower welding electrodes 8a and 8b during the welding as well.

Figure 4:
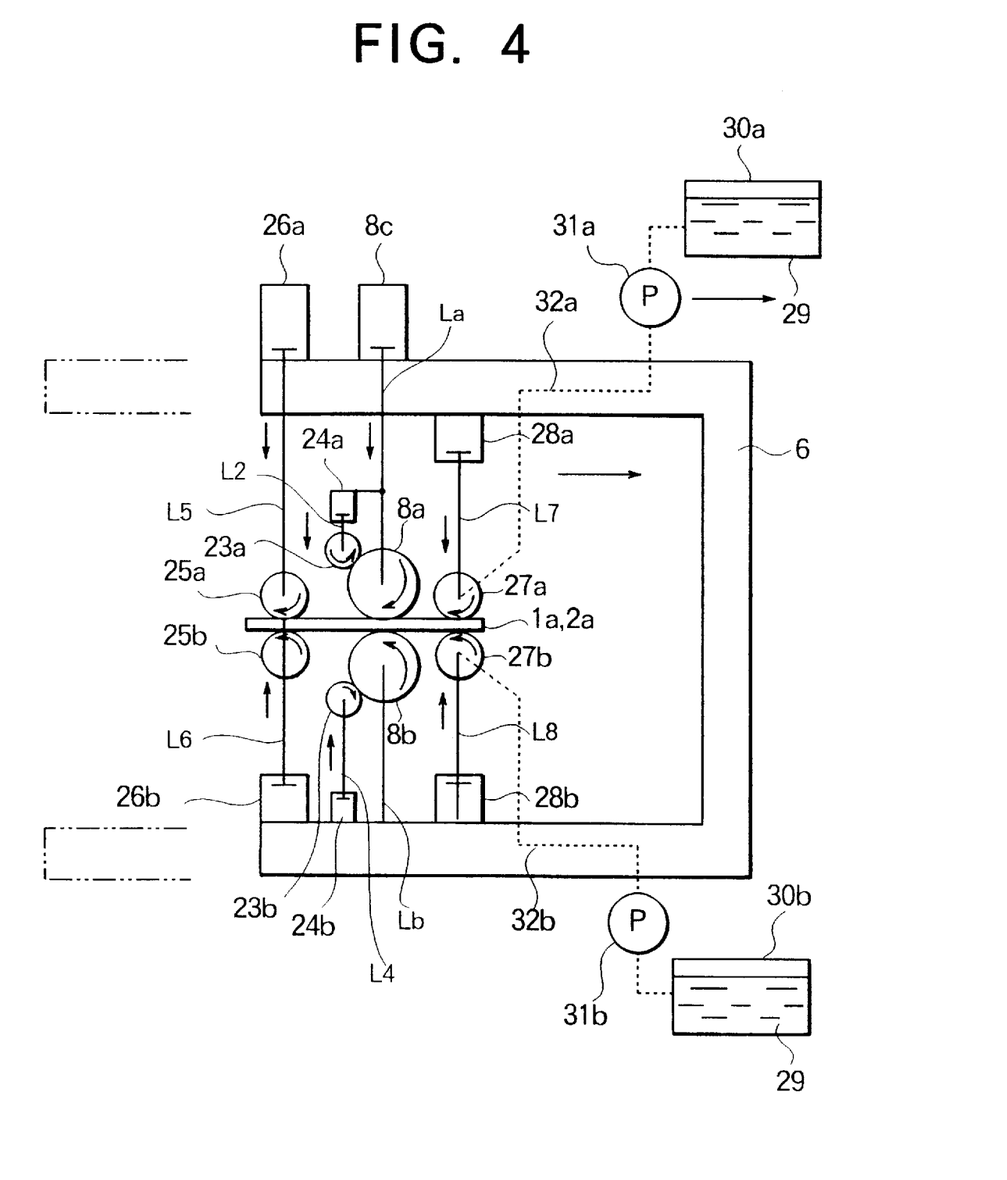
FIG. 4 is a view showing a structure of a seam welding machine according to a third embodiment of the present invention.

In the case of the seam welding machine according to another aspect of the present invention incarnated in a third embodiment thereof, it is proposed that application of the electrode protecting agent 29 on the surface portions of the strips 1a and 2a along which seam welding is to be made is performed immediately before the strips 1a and 2a are fed to between the upper welding electrode 8a and the lower welding electrode 8b by the carriage 6, and that the electrode protecting agent 29 remaining on the welded surface portion of the strip 1a; 2a is removed when the welded strips are fed out from the upper and lower welding electrodes 8a and 8b after completion of the seam welding.

FIG. 4 is a view showing a structure of a seam welding machine according to the third embodiment of the invention. In the figure, components same as or equivalent to those shown in FIG. 1 are designated by like reference characters. As described hereinbefore, in the case of the seam welding machine according to the first embodiment of the invention, the upper welding electrode 8a and the lower welding electrode 8b are applied with the electrode protecting agent 29 by the upper application roll-like member 21a and the lower application roll-like member 21b which are pressed against the peripheral surfaces of the welding electrodes 8a and 8b, respectively. By contrast, in the case of the seam welding machine according to the instant embodiment-of the invention, there are provided an upper application roll-like member 27a and a lower application roll-like member 27b which are adapted to be vertically and reciprocatively moved relative to the strips 1a and 2a by rods L7 and L8 provided in association with driving units 28a and 28b, respectively, which are installed at the entrance side of the strips.

Upon starting of the seam welding, the strips 1a and 2a are fed into between the upper application roll-like members 27a and the lower application roll-like members 27b which are caused to contact with each other under pressure by means of the rods L7 and L8 movable vertically, whereby the electrode protecting agent 29 is applied to the surface portions along which the strips 1a and 2a are to be welded to each other. The electrode protecting agent 29 on the strip surface portions is then applied to the peripheral surfaces of the welding electrodes in a rubbing fashion, so to say. In succession, the strips 1a and 2a are fed into between the upper welding electrode 8a and the lower welding electrode 8b which are in contact with each other under pressure, whereupon seam welding is carried out. In the course of the welding, the peripheral surfaces of the first upper and lower removing roll-like members 23a and 23b are forced to bear against those of the welding electrodes, whereby excessive electrode protecting agent 29 is removed.

Further, the strip 1a; 2a is fed out from the upper and lower welding electrodes 8a and 8b to the exit side of the seam welding machine to be transported into between the second upper and lower removing roll-like members 25a and 25b which are located at the work side of the seam welding machine. The excessive electrode protecting agent 29 remaining on the surface of the welded strip is removed.

Thus, according to the teachings of the invention incarnated in the instant embodiment, a correct or appropriate amount of the electrode protecting agent 29 can be applied to the peripheral surfaces of the upper and lower welding electrodes 8a and 8b.

Modifications

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

By way of example, although it has been described that each of the upper application roll-like member 21a; 27a and the lower application roll-like member 21b; 27b is formed by winding around the roll 34a; 34b with the sponge layer 35a; 35b, it is possible to realize each of the upper application roll-like member 21a; 27a and the lower application roll-like member 21b; 27b by winding around the roll 34a; 34b with a felt layer or a brush-like layer formed of a soft material and implanted densely with capillary projections. In other words, any suitable material can be used for forming the application layer surrounding the roll so far as the electrode protecting agent 29 can soak out through the layer under the effect of the capillarity.

Similarly, each of the upper removing roll-like members 23a and 25a and the lower removing roll-like members 23b and 25b may be implemented by winding a felt material or a sponge sheet around a roll member, so far as the former is capable of soaking up the electrode protecting agent 29 under the effect of the capillarity. Additionally, the upper application roll-like members 21a and 27a, the lower application roll-like members 21a and 27b, the upper removing roll-like members 23a and 25a and the lower removing roll-like members 23b and 25b may be operated under the control of a controller (not shown) in conformance with the application process, the welding process and the projecting agent removal process. In this conjunction, the cylinder device serving as the driving unit may be constituted by an pneumatic cylinder, a hydraulic cylinder or a solenoid cylinder suited for practical applications.

The upper application roll-like members 21a and 27a, the lower application roll-like members 21b and 27b, the upper removing roll-like members 23a and 25a and the lower removing roll-like members 23b and 25b may be rotationally driven positively to thereby effectuate smoothly the protecting agent applying operation as well as the removing operation. It should additionally be mentioned that as the electrode protecting agent 29, there may be used a machine oil, a grease, an anti-rust agent or the like so far as it can weaken "wettability" of a surface portion of the strips subjected to the seam welding by the welding electrodes.

Accordingly, all suitable modifications and equivalents may be resorted to, falling within the spirit and scope of the invention.

What is claimed is:

1. A seam welding machine, comprising:
   a movable supporting member adapted to move in a direction orthogonal to a direction in which materials to be welded are fed;
   a pair of rotatable disk-like welding electrodes disposed on said movable supporting member for welding together said materials by pressing said materials to each other at surface portions thereof along which said materials are to be welded together as said movable supporting member is moved; and
   electrode protecting agent applying means for applying an electrode protecting agent onto rotating surfaces of said welding electrodes while being in physical contact with said welding electrodes under a pressure, said electrode protecting agent being charged from an electrode protecting agent supplying means.

2. A seam welding machine according to claim 1, further comprising:
   removal means adapted to be brought into contact with a rotating surface of each of said welding electrodes to thereby remove excess electrode protecting agent from said rotating surface of each of said welding electrodes.

3. A seam welding machine according to claim 2, wherein said removal means is formed of a roll-like member of a soft material capable of wiping off said electrode protecting agent.

4. A seam welding machine according to claim 2, wherein said removal means is driven reciprocatively relative to said materials to be welded together.

5. A seam welding machine according to claim 4, wherein said removal means has a roll-like surface which is rotationally driven.

6. A seam welding machine according to claim 1, further comprising:
   removal means disposed on said movable supporting member for removing electrode protecting agent remaining on surface portions along which said materials to be welded were welded together at an exit side relative to said welding electrodes.

7. A seam welding machine according to claim 1, wherein said electrode protecting agent applying means is formed of a roll-like member of a soft material which allows said electrode protecting agent as charged to soak out.

8. A seam welding machine according to claim 1, wherein said electrode protecting agent applying means is driven reciprocatively relative to said materials to be welded together.

9. A seam welding machine, comprising:
   a movable supporting member adapted to move in a direction orthogonal to a direction in which materials to be welded are fed;
   a pair of rotatable disk-like welding electrodes disposed on said movable supporting member for welding together said materials by pressing said materials to each other at surface portions thereof along which said materials are to be welded together as said movable supporting member is moved; and
   electrode protecting agent applying means for applying an electrode protecting agent onto surface portions of said materials along which said materials are to be welded together at a drive side relative to said welding electrodes while being placed in contact with said surface portions of the material to be welded under a pressure, said electrode protecting agent being charged from an electrode protecting agent supplying means.

10. A seam welding machine according to claim 9, further comprising:
    removal means adapted to be brought into contact with a rotating surface of each of said welding electrodes to thereby remove excess electrode protecting agent from said rotating surface of each of said welding electrodes.

11. A seam welding machine according to claim 9, further comprising:
    removal means disposed on said movable supporting member for removing electrode protecting agent remaining on surface portions along which said materials were welded together at a work side relative to said welding electrodes.

12. A seam welding machine according to claim 11, wherein said removal means is formed of a roll-like member of a soft material capable of wiping off said electrode protecting agent.

13. A seam welding machine according to claim 11, wherein said removal means is driven reciprocatively relative to said materials to be welded together.

14. A seam welding machine according to claim 13, wherein said removal means has a roll-like surface which is rotationally driven.

15. A seam welding machine according to claim 9,
wherein said electrode protecting agent applying means is formed of a roll-like member of a soft material which allows said electrode protecting agent as charged to soak out.

16. A seam welding machine according to claim 15,
wherein said roll-like electrode protecting agent applying means has a roll-like surface which is rotationally driven.

17. A seam welding machine according to claim 9,
wherein said electrode protecting agent applying means is driven reciprocatively relative to said materials to be welded together.

18. A method of protecting welding electrodes comprising the steps of:
charging electrode protecting agent applying means with an electrode protecting agent by electrode protecting agent charging means;
applying said electrode protecting agent as charged onto peripheral surfaces of a pair of rotatable disk type welding electrodes while rotating the same at least a time point before seam welding is started or in the course of said seam welding and while the electrode protecting agent applying means is in physical contact with said welding electrode under pressure; and
removing by removal means electrode protecting agent remaining on a material which has undergone seam welding by said pair of welding electrodes to which said electrode protecting agent has been applied and which has been fed out from said pair of welding electrodes.

19. A welding electrode protecting method according to claim 18,
wherein in said electrode protecting agent applying step, said electrode protecting agent is applied onto said welding electrodes continuously during welding of said materials.

20. A welding electrode protecting method according to claim 18,
wherein in said electrode protecting agent applying step, said electrode protecting agent is applied onto surface portions of materials which are to be welded to each other on the way to being fed to said welding electrodes to thereby apply said electrode protecting agent onto peripheral surfaces of said welding electrodes.

* * * * *